(12) United States Patent
Jayanth et al.

(10) Patent No.: US 12,120,431 B2
(45) Date of Patent: Oct. 15, 2024

(54) TAG ASSISTED IMAGE CAPTURE PARAMETER GENERATION

(71) Applicant: Motorola Mobility LLC, Chicago, IL (US)

(72) Inventors: Jeevitha Jayanth, Bangalore (IN); Sindhu Chamathakundil, Bangalore (IN)

(73) Assignee: Motorola Mobility LLC, Chicago, IL (US)

(*) Notice: Subject to any disclaimer, the term of this patent is extended or adjusted under 35 U.S.C. 154(b) by 0 days.

(21) Appl. No.: 17/957,619

(22) Filed: Sep. 30, 2022

(65) Prior Publication Data

US 2024/0121515 A1    Apr. 11, 2024

(51) Int. Cl.
*H04N 23/61* (2023.01)
*G06T 7/70* (2017.01)
*H04N 23/73* (2023.01)
*H04N 23/88* (2023.01)

(52) U.S. Cl.
CPC .............. *H04N 23/73* (2023.01); *G06T 7/70* (2017.01); *H04N 23/88* (2023.01)

(58) Field of Classification Search
CPC ................ H04N 23/61; H04N 23/611; H04N 23/70–73; H04N 23/88; G06V 10/25
USPC ..................................................... 348/221.1
See application file for complete search history.

(56) References Cited

U.S. PATENT DOCUMENTS

| | | |
|---|---|---|
| 6,801,716 B2 | 10/2004 | Takeuchi |
| 6,952,525 B2 | 10/2005 | Lee et al. |
| 7,499,636 B2 | 3/2009 | Feng et al. |
| 8,208,061 B2 | 6/2012 | Cheng |

(Continued)

FOREIGN PATENT DOCUMENTS

| | | | |
|---|---|---|---|
| CN | 104834152 | | 2/2019 |
| DE | 102018209732 A1 | * | 12/2019 |
| KR | 20220080731 A | | 6/2022 |

OTHER PUBLICATIONS

"Flash Exposure Control", Michigan Technological University [retrieved Sep. 20, 2022]. Retrieved from the internet<https://pages.mtu.edu/~shene/DigiCam/User-Guide/FZ-10/Ext-Flash/Flash-Exposure.html#:~:text=To%20make%20flash%20exposure%20calculation,it%20reaches%20a%20preset%20level>., 3 Pages.

(Continued)

*Primary Examiner* — Anthony J Daniels
(74) *Attorney, Agent, or Firm* — FIG. 1 Patents (57) ABSTRACT

A computing device includes digital imaging functionality that captures images digitally using any of a variety of different technologies. The computing device receives an indication of, or determines, a physical location of a tag within a field of view of an image capture module and associates that physical location with a region of interest in the field of view. The tag is a device that transmits and receives signals allowing one or more other devices to determine the physical location of the tag, such as an ultra-wideband tag. The computing device also includes a parameter generation system that automatically generates, based at least in part on the region of interest associated with the physical location of the tag, one or more parameters for capturing a digital image. These parameters include, for example, an exposure setting, a white balance setting, and a focus setting.

20 Claims, 6 Drawing Sheets

(56) References Cited

U.S. PATENT DOCUMENTS

| | | |
|---|---|---|
| 9,094,611 B2 | 7/2015 | Kennedy et al. |
| 10,547,793 B2 | 1/2020 | Wang et al. |
| 11,576,246 B2 | 2/2023 | Petricek |
| 2006/0238370 A1 | 10/2006 | Park et al. |
| 2007/0230933 A1 | 10/2007 | Sugimoto et al. |
| 2008/0075445 A1 | 3/2008 | Whillock et al. |
| 2010/0045854 A1 | 2/2010 | Cheng et al. |
| 2015/0168219 A1 | 6/2015 | Itoh et al. |
| 2016/0050518 A1 | 2/2016 | Seo et al. |
| 2016/0124288 A1* | 5/2016 | Yang .................... G03B 13/36 348/348 |
| 2016/0182801 A1* | 6/2016 | Luk ........................ G06F 3/005 348/207.11 |
| 2016/0277648 A1 | 9/2016 | Yamaguchi |
| 2017/0123041 A1* | 5/2017 | Bae ........................ H04N 5/144 |
| 2017/0289421 A1 | 10/2017 | Tan et al. |
| 2019/0215436 A1* | 7/2019 | Lee .................... H04N 23/6811 |
| 2019/0342491 A1* | 11/2019 | Mandavilli ........ G06V 40/1365 |
| 2021/0190483 A1 | 6/2021 | Ilg et al. |
| 2021/0304577 A1 | 9/2021 | Hollar et al. |
| 2022/0058826 A1 | 2/2022 | Hasegawa et al. |
| 2022/0076018 A1* | 3/2022 | Geiss .................... H04N 23/61 |
| 2022/0303468 A1 | 9/2022 | Murakami |
| 2023/0171493 A1* | 6/2023 | Omelchenko ........ H04N 23/632 348/346 |
| 2023/0232106 A1* | 7/2023 | Hwang .................. H04N 23/45 348/262 |
| 2024/0161439 A1 | 5/2024 | Prabhu et al. |

OTHER PUBLICATIONS

Vorenkamp, Todd, "How Focus Works", B&H explora [retrieved Sep. 20, 2022]. Retrieved from the internet <https://www.bhphotovideo.com/explora/photography/tips-and-solutions/how-focus-works#:~:text=A%20computer%20inside%20the%20camera,vertical%20details%20in%20the%20image.>., Mar. 19, 2015, 24 Pages.

U.S. Appl. No. 17/988,539, "Non-Final Office Action", U.S. Appl. No. 17/988,539, filed Aug. 15, 2024, 10 pages.

* cited by examiner

TAG ASSISTED IMAGE CAPTURE PARAMETER GENERATION

BACKGROUND

As technology has advanced our uses for computing devices have expanded. One such use is digital photography. Many computing devices, such as mobile phones, include imaging devices allowing users to capture digital images. While many users enjoy the ability to capture digital images with their computing devices, current imaging devices are not without their problems. One such problem is that computing devices typically use 3A (automatic focus, automatic exposure, automatic white balance) estimation algorithms that automatically determine appropriate 3A settings for capturing images. These 3A estimation algorithms, however, do not always account for a region of interest that the user is interested in, which can be frustrating for users and lead to user frustration with their devices.

BRIEF DESCRIPTION OF THE DRAWINGS

Embodiments of tag assisted image capture parameter generation are described with reference to the following drawings. The same numbers are used throughout the drawings to reference like features and components.

DETAILED DESCRIPTION

Tag assisted image capture parameter generation is discussed herein. Generally, a computing device includes digital imaging functionality that captures images digitally using any of a variety of different technologies. The computing device receives an indication of, or determines, a physical location of a tag within a field of view of an image capture module and associates that physical location with a region of interest in the field of view. The tag is a device that transmits and receives signals allowing one or more other devices to determine the physical location of the tag, such as an ultra-wideband (UWB) tag. The computing device also includes a parameter generation system that automatically generates, based at least in part on the region of interest associated with the physical location of the tag, one or more parameters for capturing a digital image. These parameters include, for example, an exposure setting, a white balance setting, a focus setting, and so forth.

In contrast to traditional manners of determining parameters for capturing a digital image, the techniques discussed herein determine parameters for capturing a digital image based at least in part on a region of interest associated with a tag within a field of view of the image capture module. This allows the region of interest associated with any desired item or area to be taken into account (e.g., prioritized) when determining parameters for capturing the digital image. The region of interest is automatically identified by the computing device without requiring any user input specifying the region of interest (e.g., without requiring the user to touch a region of interest on a viewfinder). Accordingly, a region of interest that the user is interested in (e.g., a trophy in the preview frame) that is not accounted for using traditional manners of determining parameters for capturing the digital, is accounted for in determining parameters for capturing the digital image using the techniques discussed herein.

Figure 1:
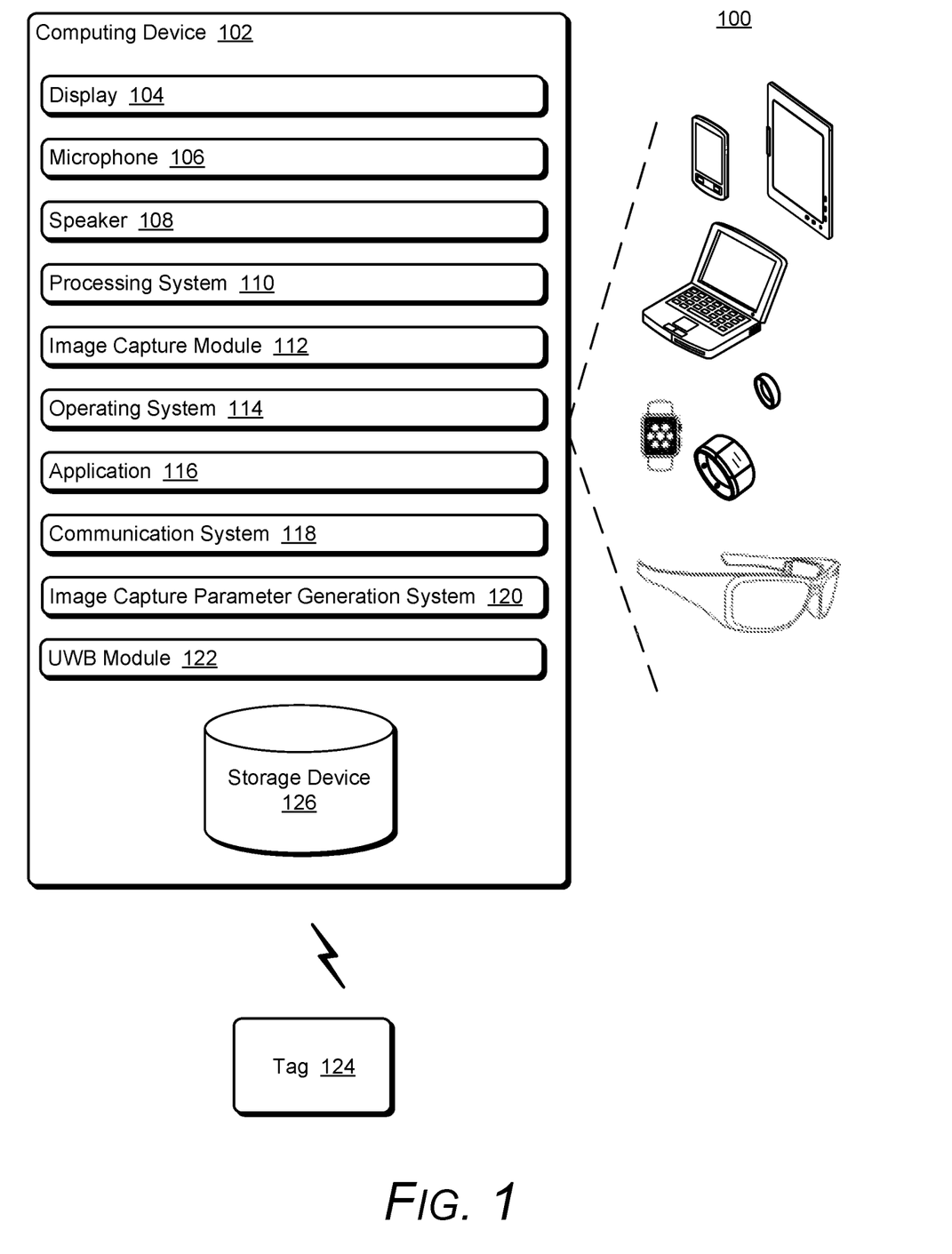
FIG. 1 illustrates an example system including a computing device implementing the techniques discussed herein.

FIG. 1 illustrates an example system 100 including a computing device 102 implementing the techniques discussed herein. The computing device 102 can be, or include, many different types of computing or electronic devices. For example, the computing device 102 can be a smartphone or other wireless phone, a notebook computer (e.g., netbook or ultrabook), a laptop computer, a camera (e.g., compact or single-lens reflex), a wearable device (e.g., a smartwatch, a ring or other jewelry, augmented reality headsets or glasses, virtual reality headsets or glasses), a tablet or phablet computer, a personal media player, a personal navigating device (e.g., global positioning system), an entertainment device (e.g., a gaming console, a portable gaming device, a streaming media player, a digital video recorder, a music or other audio playback device), a video camera, an Internet of Things (IoT) device, a fitness tracker, a smart TV, an automotive computer, a device that includes a UWB module, and so forth.

The computing device 102 includes a display 104, a microphone 106, and a speaker 108. The display 104 can be configured as any suitable type of display, such as an organic light-emitting diode (OLED) display, active matrix OLED display, liquid crystal display (LCD), in-plane shifting LCD, projector, and so forth. The microphone 106 can be configured as any suitable type of microphone incorporating a transducer that converts sound into an electrical signal, such as a dynamic microphone, a condenser microphone, a piezoelectric microphone, and so forth. The speaker 108 can be configured as any suitable type of speaker incorporating a transducer that converts an electrical signal into sound, such as a dynamic loudspeaker using a diaphragm, a piezoelectric speaker, non-diaphragm based speakers, and so forth.

Although illustrated as part of the computing device 102, it should be noted that one or more of the display 104, the microphone 106, and the speaker 108 can be implemented separately from the computing device 102. In such situations, the computing device 102 can communicate with the display 104, the microphone 106, or the speaker 108 via any of a variety of wired (e.g., Universal Serial Bus (USB), IEEE 1394, High-Definition Multimedia Interface (HDMI)) or wireless (e.g., Wi-Fi, Bluetooth, infrared (IR)) connections. For example, the display 104 may be separate from the computing device 102 and the computing device 102 (e.g., a streaming media player) communicates with the display 104 via an HDMI cable. By way of another example, the microphone 106 may be separate from the computing device 102 (e.g., the computing device 102 may be a television and the microphone 106 may be implemented in a remote control device) and voice inputs received by the microphone 106 are communicated to the computing device 102 via an IR or radio frequency wireless connection.

The computing device 102 also includes a processing system 110 that includes one or more processors, each of which can include one or more cores. The processing system 110 is coupled with, and may implement functionalities of, any other components or modules of the computing device 102 that are described herein. In one or more embodiments, the processing system 110 includes a single processor having a single core. Alternatively, the processing system 110 includes a single processor having multiple cores or multiple processors (each having one or more cores).

The computing device 102 also includes an image capture module 112, also referred to as an image capture device. The image capture module 112 captures images digitally using any of a variety of different technologies, such as a charge-coupled device (CCD) sensor, a complementary metal-oxide-semiconductor (CMOS) sensor, combinations thereof, and so forth. The image capture module 112 can include a single sensor and lens, or alternatively multiple sensors or multiple lenses. For example, the image capture module 112 may have at least one lens and sensor positioned to capture images from the front of the computing device 102 (e.g., the same surface as the display is positioned on), and at least one additional lens and sensor positioned to capture images from the back of the computing device 102.

The computing device 102 also includes an operating system 114. The operating system 114 manages hardware, software, and firmware resources in the computing device 102. The operating system 114 manages one or more applications 116 running on the computing device 102 and operates as an interface between applications 116 and hardware components of the computing device 102.

The computing device 102 also includes a communication system 118. The communication system 118 manages communication with various other devices, including establishing voice calls with other devices, sending electronic communications to and receiving electronic communications from other devices, sending data to and receiving data from other devices, and so forth. The content of these electronic communications and the recipients of these electronic communications is managed by, for example, an application 116, the operating system 114, or an image capture parameter generation system 120.

The computing device 102 also includes a UWB module 122 or chip which is responsible for communicating with a UWB tag, such as tag 124, attached to a subject. The tag 124 is an example of a device that the computing device 102 communicates with. The tag 124 is a device that allows its physical location to be identified or determined. The tag 124 can be any size, but oftentimes is small (e.g., the size of a quarter) to allow the tag 124 to be easily coupled to another device, person, other subject, and so forth. The tag 124 is attached to or located near an object to be tracked.

The physical location of the tag 124 is determined (e.g., by the UWB module 122, the communication system 118, a combination thereof, and so forth) in any of a variety of different manners. In one or more implementations, the tag 124 and the communication system 118 transmit and receive signals in accordance with UWB standards. The distance, angle of arrival (AoA), and location of the tag 124 relative to the computing device 102 is readily determined based on the time it takes signals to travel between the tag 124 and the computing device 102, and optionally between the tag 124 and other devices. The communication system 118 (or another module or system of the computing device 102, such as the UWB module 122) can use various techniques in accordance with the UWB standards to determine the distance between the tag 124 and the computing device 102, such as two-way ranging (TWR), time difference of arrival (TDoA), reverse TDoA, or phase difference of arrival (PDoA). An AoA of signals received from a device can be readily determined in various manners, such as by determining a difference in the phase of the signal at different receiving devices (e.g., different antennas of the computing device 102) using PDoA. Using UWB allows the physical location of the tag 124 to be determined more accurately than other techniques, such as within 5 to 10 centimeters.

Additionally or alternatively, the tag 124, communication system 118, and UWB module 122 use other technologies to transmit and receive signals that identify the location of the tag 124 or allow the location of the tag 124 to be determined. For example, the tag 124 and communication system 118 may transmit and receive signals in accordance with other standards, such as Bluetooth™ standards, WiFi™ standards, and so forth. Various techniques may be used to determine the physical location of the tag 124, such as triangulation based on signals received from various devices (e.g., the computing device 102 and other devices), based on signals received from different antennas of the computing device 102, and so forth.

In one or more implementations, the tag 124 also transmits various characteristics of the tag 124, such as an identifier of the tag 124 (e.g., a media access control (MAC) address), information stored in the tag 124 by an owner or user of the tag 124, and so forth. Additionally or alternatively, characteristics of the tag 124, such as information provided by an owner or user of the tag 124, may be maintained by the computing device 102 (e.g., in a storage device 126) or in a cloud service. In one or more implementations, the computing device 102 communicates with any tag 124 within communication range of the computing device 102 to determine the physical location of the tag. Additionally or alternatively, the computing device 102 is associated with particular tags (e.g., the identifier of the tag 124 is recorded by the computing device 102 or by a cloud service during a tag registration process), and the computing device communicates with tags that are associated with the computing device 102 to determine the physical locations of such tags. Accordingly, in such situations the communication system 118 provides an indication of the physical location of a tag 124 to the image capture parameter generation system 120 only if the computing device is associated with the tag 124.

The image capture parameter generation system 120 receives an indication of the physical location of the tag 124. This indication may be generated by the communication system 118 or by another module or system of the computing device 102 as discussed above. The image capture parameter generation system 120 uses the physical location of the tag 124 to determine a region of interest in the field of view of the image capture module 112, and this region of interest is used to determine one or more parameters for the image capture module 112 to use in capturing a digital image. These parameters include, for example, an exposure setting, a white balance setting, a focus setting, and so forth. This allows the region of interest associated with any desired item or area to be taken into account (e.g., prioritized) when determining parameters for capturing the digital image. The region of interest is automatically identified by the computing device without requiring any user input specifying the region of interest (e.g., without requiring the user to touch a region of interest on a viewfinder).

The image capture parameter generation system 120 can be implemented in a variety of different manners. For example, the image capture parameter generation system 120 can be implemented as multiple instructions stored on computer-readable storage media and that can be executed by the processing system 110. Additionally or alternatively, the image capture parameter generation system 120 can be implemented at least in part in hardware (e.g., as an application-specific integrated circuit (ASIC), a field-programmable gate array (FPGA), an application-specific standard product (ASSP), a system-on-a-chip (SoC), a complex programmable logic device (CPLD), and so forth).

In one or more implementations, the tag-based image capture parameter generation may be enabled or disabled. When enabled, regions of interest determined based on the physical location of the tag 124 are used to determine one or more parameters for the image capture module 112. However, when disabled, regions of interest determined based on the physical location of the tag 124 are not used to determine one or more parameters for the image capture module 112. The tag-based image capture parameter generation may be enabled or disabled in any of a variety of different manners, such as based on a user preference setting, based on a default setting, and so forth.

The computing device 102 also includes a storage device 126. The storage device 126 can be implemented using any of a variety of storage technologies, such as magnetic disk, optical disc, Flash or other solid state memory, and so forth. The storage device 126 can store various program instructions and data for any one or more of the operating system 114, application 116, and the image capture parameter generation system 120.

Figure 2:
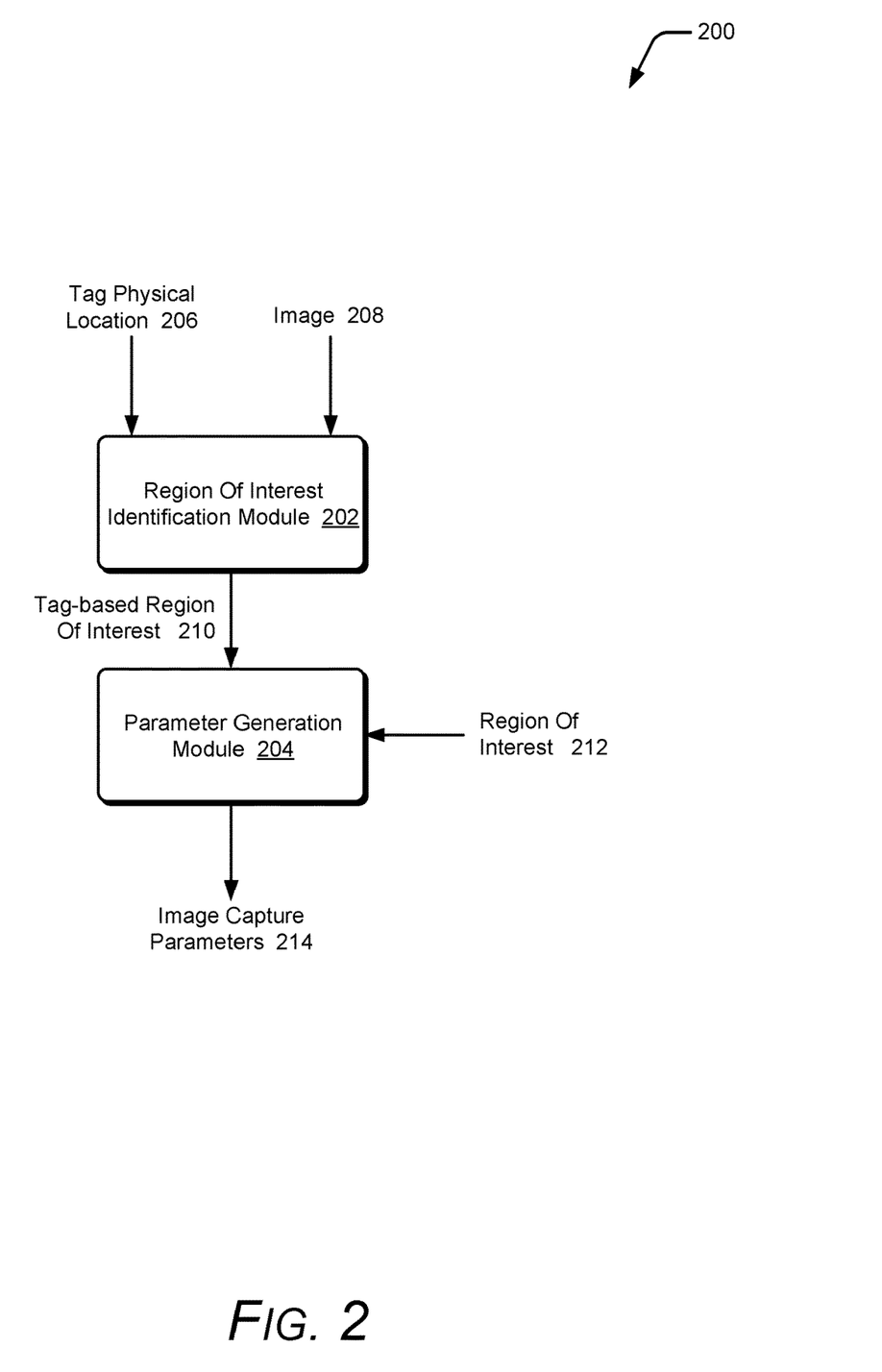
FIG. 2 illustrates an example system implementing the techniques discussed herein.

FIG. 2 illustrates an example system 200 implementing the techniques discussed herein. The system 200 implements, for example, an image capture parameter generation system 120. The system 200 includes a region of interest identification module 202 and a parameter generation module 204. The region of interest identification module 202 receives a tag physical location 206, such as the physical location of a tag 124 of FIG. 1, and an image 208. The image 208 is an image sensed or captured by the image capture module 112. The image 208 is typically a preview frame that is displayed by a screen (e.g., viewfinder) of the computing device 102 but is not stored long-term in the computing device 102 (e.g., stored for no more than a few seconds).

In one or more implementations, the image capture module 112 senses and displays frames of video, also referred to as preview frames, at a particular rate (e.g., 60 images or frames per second). The preview frames provide the user an indication of the scene that the image capture module 112 will capture and store (e.g., in storage device 126 or cloud storage) if requested, such as by user input to the computing device 102 to capture an image (e.g., user selection of a button on the computing device 102). The techniques discussed herein determine image capture parameters used by the image capture module 112 when capturing and storing images, as well as when sensing and displaying preview frames.

The region of interest identification module 202 determines a location of the tag in the image 208. The tag physical location 206 indicates various location information for the tag, including the azimuth and the elevation of the tag. This location information is generated based on any of various different standards, such as UWB standards.

Figure 3:
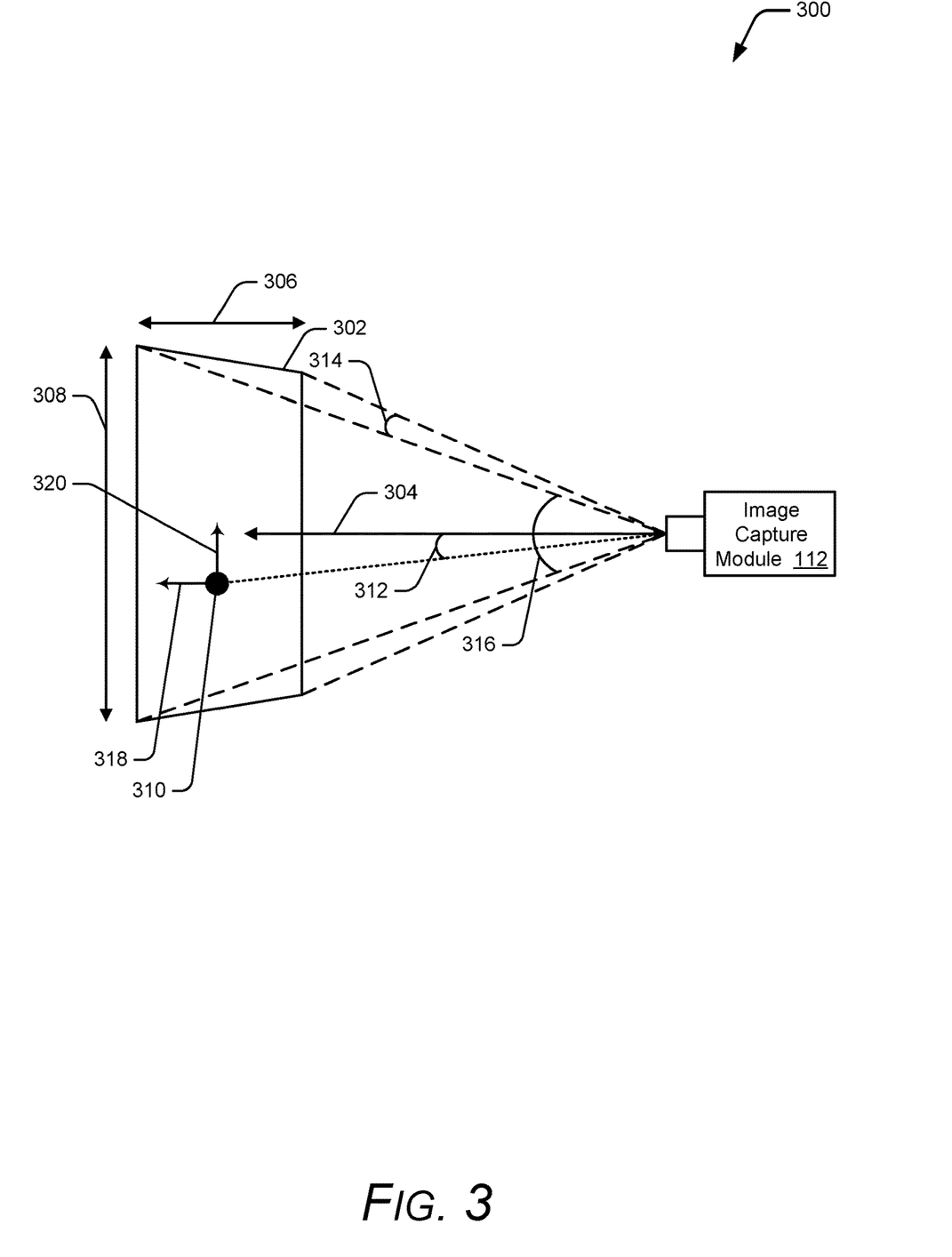
FIG. 3 illustrates an example of a scene being captured by an image capture module.

FIG. 3 illustrates an example 300 of a scene being captured by an image capture module. The example 300 illustrates a scene 302 being captured by an image capture module 112 having a line of sight 304. The scene 302 has a width 306 and a height 308 that varies based on the field of view of the image capture module 112. A tag 124 is located in the scene 302 at a location 310. An AoA of signals received from the tag 124 is illustrated at 312. A horizontal field of view angle 314 and a vertical field of view angle 316 are also illustrated. These various values can be used to determine a range of (x, y) locations (coordinates) of the tag 124 in a Cartesian coordinate system of the captured image having an x axis 318 and a y axis 320.

The following discusses an example of estimating the UWB tag location in the field of view of the image capture module 112. It is to be appreciated that this discussion is only an example and that the UWB tag location in the field of view of the image capture module 112 can be determined in any of a variety of different manners.

The angle of view (Aov) of the image capture module 112 is:

$$Aov = \frac{2 \times \arctan\left(\frac{\text{sensor dimension}}{2}\right)}{\text{focal length}}$$

where sensor dimension refers to the dimension of the imaging sensor of the image capture module 112, and focal length refers to focal length of the image capture module 112.

The range of (x, y) coordinates of the tag 124 in the captured images is based on values XuwbRatio and YuwbRatio as follows:

$$XuwbRatio = \frac{\tan(Az)}{\tan(AovH/2)}$$

$$YuwbRatio = \frac{\tan(El)}{\tan(AovV/2)}$$

where Az refers to the UWB azimuth of the physical location of the tag 124, El refers to the UWB elevation of the physical location of the tag 124, AovH refers to the horizontal field of view of the image capture module 112, and AovV refers to the vertical field of view of the image capture module 112.

The x coordinate range of the tag (Xuwb) in the captured image is determined as:

$$Xuwb = \left(\frac{ImageWidth}{2}\right) \pm \left(\left(\frac{ImageWidth}{2}\right) \times XuwbRatio\right)$$

where Image Width refers to the width 306.

The y coordinate range of the tag (Yuwb) in the captured image is determined as:

$$Yuwb = \left(\frac{ImageHeight}{2}\right) \pm \left(\left(\frac{ImageHeight}{2}\right) \times YuwbRatio\right)$$

where ImageHeight refers to the height 308.

Returning to FIG. 2, the region of interest identification module 202 associates the location of the tag in the image 208 with a region of interest in the field of view. In one or more implementations, the region of interest identification module 202 determines that the location of the tag in the image 208 is the region of interest (e.g., a single pixel, a collection of pixels surrounding the location of the tag in the image 208 (e.g., a circle with a radius of 10 or 20 pixels), and so forth).

Additionally or alternatively, given the location of the tag in the image 208, the region of interest identification module 202 determines a portion of the image 208 that includes the location of the tag as the region of interest in the image 208. The portion of the image 208 that is the region of interest may be determined using any of a variety of public or proprietary object detection techniques, such as face detection, torso detection, animal detection, generic object detection, and so forth. In one or more implementations, the region of interest identification module 202 supports multiple different object detection techniques and selects one of the multiple object detection techniques based on characteristics of the tag. For example, if the characteristics of the tag indicate the tag is associated with a person, then face detection or torso detection is used. By way of another implementation, if the characteristics of the tag indicate the tag is associated with a cat, then cat detection or animal detection is used.

Additionally or alternatively, the user of the computing device 102 sets region of interest detection preferences. For example, the user may provide a preference setting indicating that the user wants the region of interest identification module 202 to use face detection.

In one or more implementations, the region of interest identification module 202 receives multiple tag physical locations 206, one for each of multiple tags. In such situations, for each of the multiple tags, the region of interest identification module 202 determines a region of interest in the image 208 that includes the location of the tag.

The region of interest identification module 202 provides an indication of the region of interest (which may be, for example, an indication of a single pixel or multiple pixels such as pixels displaying a torso or face) to the parameter generation module 204 as tag-based region of interest 210. In one or more implementations, in situations where the region of interest identification module 202 determines a region of interest for each of multiple tags, the region of interest identification module 202 provides multiple tag-based regions of interest 210 to the parameter generation module 204, e.g., one region of interest for each of the multiple tags. Additionally or alternatively, the region of interest identification module 202 provides to the parameter generation module 204, as one or more tag-based regions of interest 210, a subset of the determined regions of interest.

The parameter generation module 204 optionally receives one or more additional regions of interest 212. Each region of interest 212 is identified in manners other than using a tag physical location. For example, a region of interest 212 may be identified by performing face detection on all faces in the image 208, based on user selection of a person or object in the image 208 (e.g., by touching the person or object on a viewfinder of the computing device 102 displaying the image 208), and so forth.

The parameter generation module 204 generates, based on the received one or more regions of interest 210 and any received regions of interest 212, one or more image capture parameters 214. These image capture parameters 214 may include, for example, one or more of an exposure setting, a white balance setting, and a focus setting. The image capture parameters 214 may optionally include one or more additional image capture parameters, such as a focus setting. Accordingly, the parameter generation module 204 automatically generates the image capture parameters to be used by the image capture module 112 to capture images.

The parameter generation module 204 generates the image capture parameters 214 by prioritizing the received one or more regions of interest over other regions of the image. The parameter generation module 204 uses any of a variety of public or proprietary techniques or algorithms to generate the image capture parameters 214 based on the one or more regions of interest.

In one or more implementations, generating the image capture parameters 214 is also referred to as performing 3A (automatic focus, automatic exposure, automatic white balance) estimation on the image 208 and computes the 3A parameters that will be used by the 3A algorithms for producing higher-quality images. The 3A estimation algorithms analyze the image data or elements present in the image 208 to compute the 3A parameters by giving prominence (e.g., priority) to the received regions of interest in the frame, generating the 3A parameters such that the regions of interest will be captured with good exposure, focus & is well white balanced.

Figure 4:
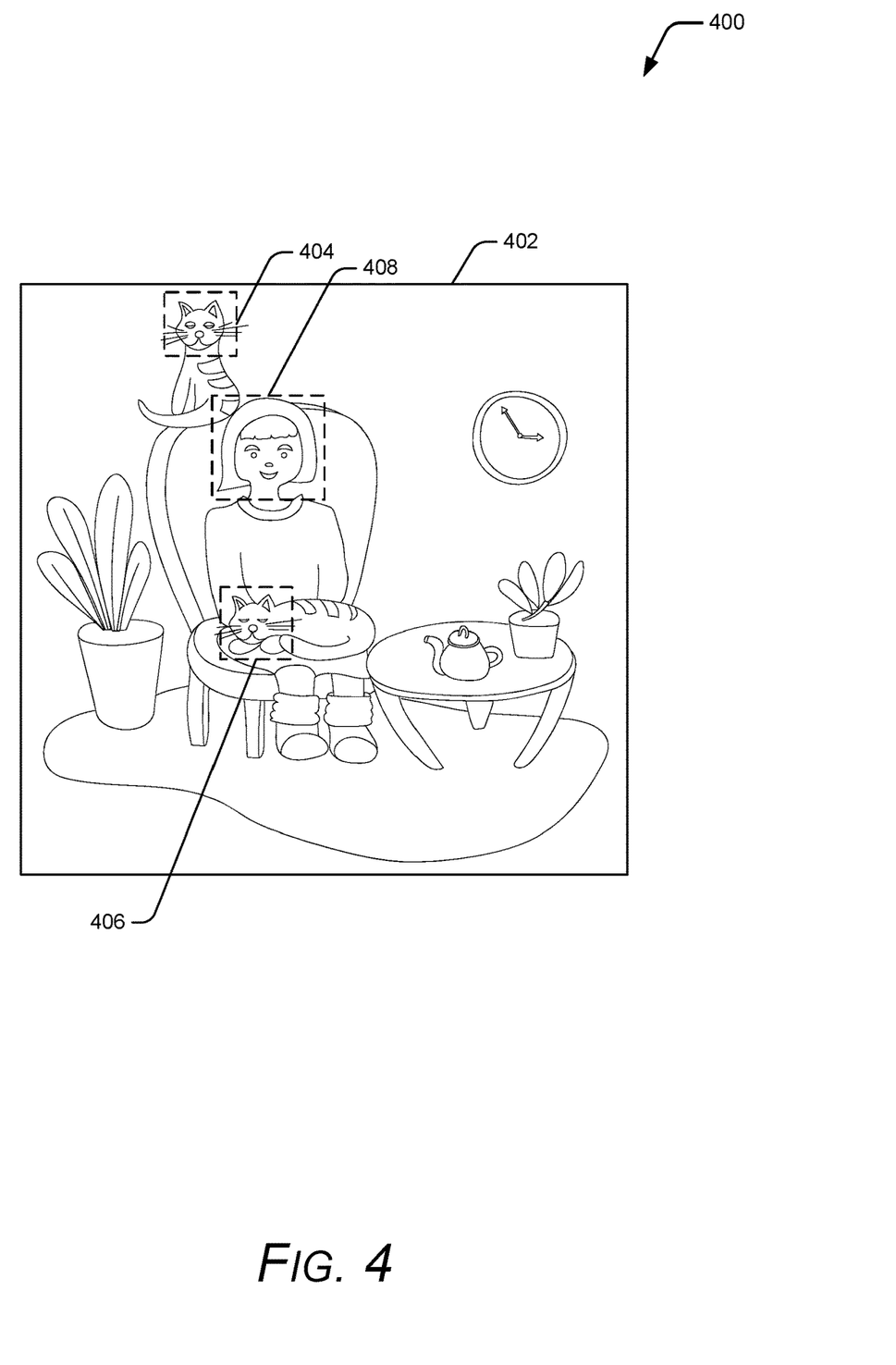
FIG. 4 illustrates an example of using the techniques discussed herein.

FIG. 4 illustrates an example of using the techniques discussed herein. The example 400 illustrates a preview frame 402 captured or sensed by an image capture module. In the example 400, assume that both cats are wearing collars that include a tag. A region of interest around each of the cat's faces is determined, illustrated as dashed boxes 404 and 406. Furthermore, assume that the woman is also wearing a tag. A region of interest around the woman's face is also determined, illustrated as dashed box 408. These regions of interest are determined automatically without requiring a user to select each region (e.g., by touching each of the cats and the woman's face in a viewfinder displaying the preview frame 402). Given these regions of interest, the image capture parameters for the image capture module are determined by prioritizing the regions illustrated by the dashed boxes 404, 406, and 408, resulting in an image being captured with those regions of having good exposure, focus, and white balance.

Figure 5:
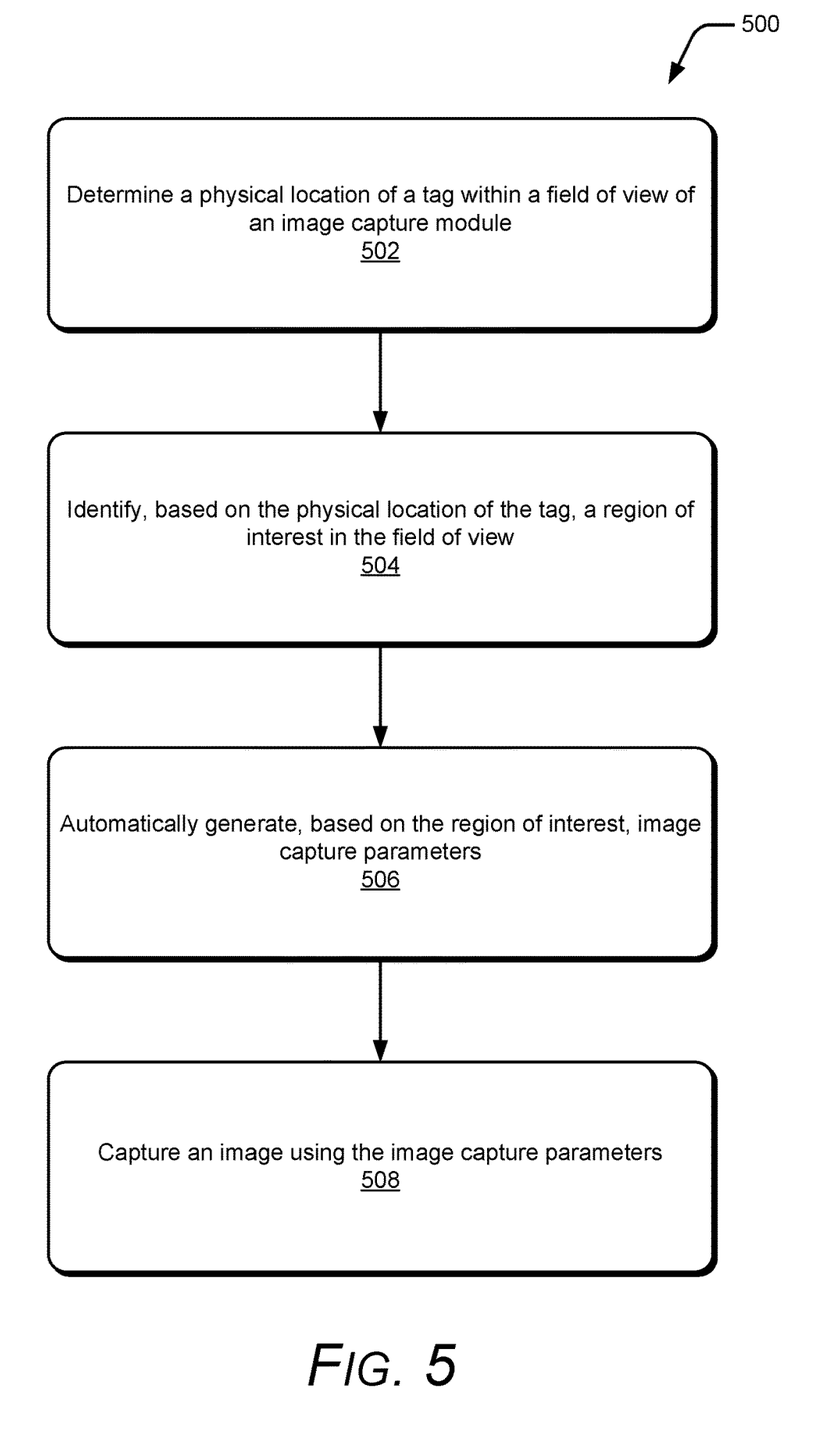
FIG. 5 illustrates an example process for implementing the techniques discussed herein in accordance with one or more embodiments.

FIG. 5 illustrates an example process 500 for implementing the techniques discussed herein in accordance with one or more embodiments. Process 500 is carried out by, for example, a communication system, an image capture parameter generation system, and an image capture module, such as communication system 118, image capture parameter generation system 120, and image capture module 112 of FIG. 1, and can be implemented in software, firmware, hardware, or combinations thereof. Process 500 is shown as a set of acts and is not limited to the order shown for performing the operations of the various acts.

In process 500, a physical location of a tag within a field of view of an image capture module is determined (act 502). This tag is, for example, a UWB device.

A region of interest in the field of view is identified based on the physical location of the tag (act 504). The region of interest is, for example, a portion of the field of view (or a preview frame captured or sensed by the image capture module 112) that includes the tag. One or more additional regions of interest are also optionally identified (or received from another system or module) in manners other than using a tag physical location. These one or more additional regions of interest may be identified in any of a variety of manners, such as by performing face detection on all faces in a preview frame, based on user selection of a person or object in a preview frame (e.g., by touching the person or object on a viewfinder of the computing device displaying the preview frame), and so forth.

Image capture parameters are automatically generated based on the region of interest (act 506). For example, the region of interest is prioritized when generating the image capture parameters, which may include at least one of an exposure setting, a white balance setting, and a focus setting for the image capture module.

An image is captured using the image capture parameters (act 508). For example, the image capture module captures an image using at least one of the exposure setting, the white balance setting, and the focus setting.

Figure 6:
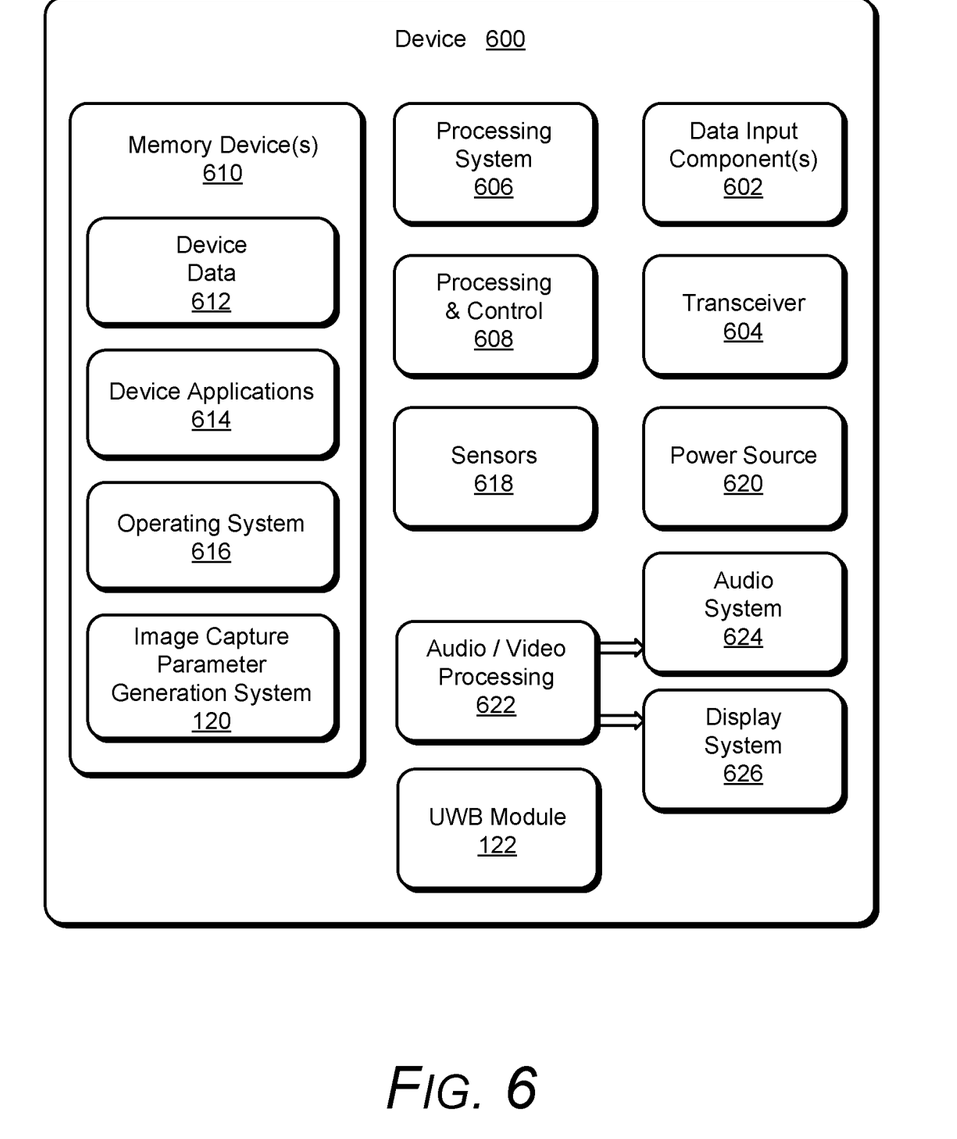
FIG. 6 illustrates various components of an example electronic device that can implement embodiments of the techniques discussed herein.

FIG. 6 illustrates various components of an example electronic device that can implement embodiments of the techniques discussed herein. The electronic device 600 can be implemented as any of the devices described with reference to the previous FIGS., such as any type of client device, mobile phone, tablet, computing, communication, entertainment, gaming, media playback, a device including a UWB module, or other type of electronic device. As illustrated, the electronic device 600 includes the image capture parameter generation system 120 and UWB module 122, described above.

The electronic device 600 includes one or more data input components 602 via which any type of data, media content, or inputs can be received such as user-selectable inputs, messages, music, television content, recorded video content, and any other type of text, audio, video, or image data received from any content or data source. The data input components 602 may include various data input ports such as universal serial bus ports, coaxial cable ports, and other serial or parallel connectors (including internal connectors) for flash memory, DVDs, compact discs, and the like. These data input ports may be used to couple the electronic device to components, peripherals, or accessories such as keyboards, microphones, or cameras. The data input components 602 may also include various other input components such as microphones, touch sensors, touchscreens, keyboards, and so forth.

The device 600 includes communication transceivers 604 that enable one or both of wired and wireless communication of device data with other devices. The device data can include any type of text, audio, video, image data, or combinations thereof. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (WiMAX™) standards, wired local area network (LAN) Ethernet transceivers for network data communication, and cellular networks (e.g., third generation networks, fourth generation networks such as LTE networks, or fifth generation networks).

The device 600 includes a processing system 606 of one or more processors (e.g., any of microprocessors, controllers, and the like) or a processor and memory system implemented as a system-on-chip (SoC) that processes computer-executable instructions. The processing system 606 may be implemented at least partially in hardware, which can include components of an integrated circuit or on-chip system, an application-specific integrated circuit (ASIC), a field-programmable gate array (FPGA), a complex programmable logic device (CPLD), and other implementations in silicon or other hardware.

Alternately or in addition, the device can be implemented with any one or combination of software, hardware, firmware, or fixed logic circuitry that is implemented in connection with processing and control circuits, which are generally identified at 608. The device 600 may further include any type of a system bus or other data and command transfer system that couples the various components within the device. A system bus can include any one or combination of different bus structures and architectures, as well as control and data lines.

The device 600 also includes computer-readable storage memory devices 610 that enable data storage, such as data storage devices that can be accessed by a computing device, and that provide persistent storage of data and executable instructions thereon (e.g., software applications, programs, functions, and the like). These executable instructions cause, responsive to execution by the processing system 606, the device 600 to perform various acts. Examples of the computer-readable storage memory devices 610 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 600 may also include a mass storage media device.

The computer-readable storage memory device 610 provides data storage mechanisms to store the device data 612, other types of information or data, and various device applications 614 (e.g., software applications). For example, an operating system 616 can be maintained as software instructions with a memory device and executed by the processing system 606. The device applications 614 may also include a device manager, such as any form of a control application, software application, signal-processing and control module, code that is native to a particular device, a hardware abstraction layer for a particular device, and so on.

The device 600 can also include one or more device sensors 618, such as any one or more of an ambient light sensor, a proximity sensor, a touch sensor, an infrared (IR) sensor, accelerometer, gyroscope, thermal sensor, audio sensor (e.g., microphone), and the like. The device 600 can also include one or more power sources 620, such as when the device 600 is implemented as a mobile device. The power sources 620 may include a charging or power system, and can be implemented as a flexible strip battery, a rechargeable battery, a charged super-capacitor, or any other type of active or passive power source.

The device 600 additionally includes an audio or video processing system 622 that generates one or both of audio data for an audio system 624 and display data for a display system 626. In accordance with some embodiments, the audio/video processing system 622 is configured to receive call audio data from the transceiver 604 and communicate the call audio data to the audio system 624 for playback at the device 600. The audio system or the display system may include any devices that process, display, or otherwise render audio, video, display, or image data. Display data and audio signals can be communicated to an audio component or to a display component, respectively, via an RF (radio frequency) link, S-video link, HDMI (high-definition multimedia interface), composite video link, component video link, DVI (digital video interface), analog audio connection, or other similar communication link. In implementations, the audio system or the display system are integrated components of the example device. Alternatively, the audio system or the display system are external, peripheral components to the example device.

Although embodiments of techniques for tag assisted image capture parameter generation have been described in language specific to features or methods, the subject of the appended claims is not necessarily limited to the specific features or methods described. Rather, the specific features and methods are disclosed as example implementations of techniques for implementing tag assisted image capture parameter generation. Further, various different embodiments are described, and it is to be appreciated that each described embodiment can be implemented independently or in connection with one or more other described embodiments. Additional aspects of the techniques, features, and/or methods discussed herein relate to one or more of the following.

In some aspects, the techniques described herein relate to a method including: determining a physical location of a tag within a field of view of an image capture module; identifying, based on the physical location of the tag, a region of interest in the field of view; automatically generating, by prioritizing the region of interest, image capture parameters including at least one of an exposure setting and a white balance setting for the image capture module; and capturing, using at least one of the exposure setting and the white balance setting, an image.

In some aspects, the techniques described herein relate to a method, wherein the automatically generating includes automatically generating both the exposure setting and the white balance setting for the image capture module.

In some aspects, the techniques described herein relate to a method, wherein the automatically generating further includes automatically generating a focus setting for the image capture module.

In some aspects, the techniques described herein relate to a method, wherein the tag includes an ultra-wideband device.

In some aspects, the techniques described herein relate to a method, wherein identifying the region of interest includes determining a portion of a preview frame captured by the image capture module that includes the tag.

In some aspects, the techniques described herein relate to a method, wherein identifying the region of interest further includes determining, as the region of interest, a face in the preview frame captured by the image capture module.

In some aspects, the techniques described herein relate to a method, wherein identifying the region of interest further includes determining the portion based on characteristics of the tag.

In some aspects, the techniques described herein relate to a computing device including: an image capture module; a processor implemented in hardware; and a computer-readable storage memory having stored thereon multiple instructions that, responsive to execution by the processor, cause the processor to perform acts including: determine a physical location of a tag within a field of view of the image capture module; identify, based on the physical location of the tag, a region of interest in the field of view; automatically generate, by prioritizing the region of interest, image capture parameters including at least one of an exposure setting and a white balance setting for the image capture module; and cause the image capture device to capture, using at least one of the exposure setting and the white balance setting, an image.

In some aspects, the techniques described herein relate to a computing device, wherein to automatically generate at least one of the exposure setting and the white balance setting for the image capture module is to automatically generate both the exposure setting and the white balance setting for the image capture module.

In some aspects, the techniques described herein relate to a computing device, wherein the tag includes an ultra-wideband device.

In some aspects, the techniques described herein relate to a computing device, wherein to identify the region of interest is to determine a portion of a preview frame captured by the image capture module that includes the tag.

In some aspects, the techniques described herein relate to a computing device, wherein to identify the region of interest is further to determine, as the region of interest, a face in the preview frame captured by the image capture module.

In some aspects, the techniques described herein relate to a computing device, wherein to identify the region of interest is further to determine the portion based on characteristics of the tag.

In some aspects, the techniques described herein relate to a system including: a communication system, implemented at least in part in hardware, to determine a physical location of a tag within a field of view of an image capture device; a region of interest identification module, implemented at least in part in hardware, to identify, based on the physical location of the tag, a region of interest in the field of view; and a parameter generation module, implemented at least in part in hardware, to automatically generate, by prioritizing the region of interest, at least one of an exposure setting and a white balance setting for the image capture device.

In some aspects, the techniques described herein relate to a system, wherein to automatically generate at least one of the exposure setting and the white balance setting for the image capture device is to automatically generate both the exposure setting and the white balance setting for the image capture device.

In some aspects, the techniques described herein relate to a system, wherein to automatically generate at least one of an exposure setting and a white balance setting for the image capture device is further to automatically generating a focus setting for the image capture device.

In some aspects, the techniques described herein relate to a system, wherein the tag includes an ultra-wideband device.

In some aspects, the techniques described herein relate to a system, wherein to identify the region of interest is to determine a portion of a preview frame captured by the image capture device that includes the tag.

In some aspects, the techniques described herein relate to a system, wherein to identify the region of interest is further to determine, as the region of interest, a face in the preview frame captured by the image capture device.

In some aspects, the techniques described herein relate to a system, wherein to identify the region of interest is further to determine the portion based on characteristics of the tag.

What is claimed is:

1. A method comprising:
   determining a physical location of a tag within a field of view of an image capture module;
   receiving, from the tag, characteristics of the tag indicating a type of object associated with the tag;
   identifying, based on the physical location of the tag, a region of interest in the field of view using an object detection technique corresponding to the type of object;
   automatically generating, by prioritizing the region of interest, image capture parameters including at least one of an exposure setting and a white balance setting for the image capture module; and
   capturing, using at least one of the exposure setting and the white balance setting, an image.

2. The method of claim 1, wherein the automatically generating comprises automatically generating both the exposure setting and the white balance setting for the image capture module.

3. The method of claim 2, wherein the automatically generating further comprises automatically generating a focus setting for the image capture module.

4. The method of claim 1, wherein the tag comprises an ultra-wideband device.

5. The method of claim 1, wherein identifying the region of interest comprises determining a portion of a preview frame captured by the image capture module that includes the tag.

6. The method of claim 5, wherein identifying the region of interest further comprises determining, as the region of interest, a face in the preview frame captured by the image capture module.

7. A computing device comprising:
an image capture module;
a processor implemented in hardware; and
a computer-readable storage memory having stored thereon multiple instructions that, responsive to execution by the processor, cause the processor to:
determine a physical location of a tag within a field of view of the image capture module;
receive, from the tag, characteristics of the tag indicating a type of object associated with the tag;
identify, based on the physical location of the tag, a region of interest in the field of view using an object detection technique corresponding to the type of object;
automatically generate, by prioritizing the region of interest, image capture parameters including at least one of an exposure setting and a white balance setting for the image capture module; and
cause the image capture module to capture, using at least one of the exposure setting and the white balance setting, an image.

8. The computing device of claim 7, wherein to automatically generate at least one of the exposure setting and the white balance setting for the image capture module is to automatically generate both the exposure setting and the white balance setting for the image capture module.

9. The computing device of claim 7, wherein the tag comprises an ultra-wideband device.

10. The computing device of claim 7, wherein to identify the region of interest is to determine a portion of a preview frame captured by the image capture module that includes the tag.

11. The computing device of claim 10, wherein to identify the region of interest is further to determine, as the region of interest, a face in the preview frame captured by the image capture module.

12. The computing device of claim 7, wherein the multiple instructions further cause the processor to:
determine a physical location of an additional tag within the field of view of the image capture module; and
identify, based on the physical location of the additional tag, an additional region of interest in the field of view.

13. The computing device of claim 12, wherein to automatically generate the image capture parameters is to automatically generate, by prioritizing both the region of interest and the additional region of interest, the image capture parameters including at least one of the exposure setting and the white balance setting for the image capture module.

14. The computing device of claim 7, wherein to identify the region of interest is to identify, as the region of interest, an object detected using the object detection technique, the region of interest including the physical location of the tag.

15. One or more non-transitory computer-readable media storing instructions, which when executed by at least one processor, cause the at least one processor to:
determine a physical location of a tag within a field of view of an image capture device;
receive, from the tag, characteristics of the tag indicating a type of object associated with the tag;
identify, based on the physical location of the tag, a region of interest in the field of view using an object detection technique corresponding to the type of object; and
automatically generate, by prioritizing the region of interest, at least one of an exposure setting and a white balance setting for the image capture device.

16. The one or more non-transitory computer-readable media of claim 15, wherein to automatically generate at least one of the exposure setting and the white balance setting for the image capture device is to automatically generate both the exposure setting and the white balance setting for the image capture device.

17. The one or more non-transitory computer-readable media of claim 16, wherein to automatically generate at least one of the exposure setting and the white balance setting for the image capture device is further to automatically generate a focus setting for the image capture device.

18. The one or more non-transitory computer-readable media of claim 15, wherein the tag comprises an ultra-wideband device.

19. The one or more non-transitory computer-readable media of claim 15, wherein to identify the region of interest is to determine a portion of a preview frame captured by the image capture device that includes the tag.

20. The one or more non-transitory computer-readable media of claim 19, wherein to identify the region of interest is further to determine, as the region of interest, a face in the preview frame captured by the image capture device.

* * * * *